Nov. 30, 1948.   A. C. LIND   2,455,338
SCUM REMOVING APPARATUS
Filed Feb. 12, 1946   3 Sheets-Sheet 1

Inventor
Arthur C. Lind,

Inventor
A. C. Lind,
Attorney

Nov. 30, 1948.                    A. C. LIND                    2,455,338
                          SCUM REMOVING APPARATUS
Filed Feb. 12, 1946                                    3 Sheets-Sheet 3

Inventor
Arthur C. Lind,
Attorney

Patented Nov. 30, 1948

2,455,338

UNITED STATES PATENT OFFICE 2,455,338

SCUM REMOVING APPARATUS

Arthur C. Lind, Milwaukee, Wis., assignor to Chain Belt Company, Milwaukee, Wis., a corporation of Wisconsin Application February 12, 1946, Serial No. 647,133

9 Claims. (Cl. 210—51)

The invention relates to apparatus for removing oil scum and/or other similar floating matter from the surface of liquid in a sedimentation chamber or the like, and has for its principal object the provision of a relatively simple mechanism which is automatically variable in accordance with changing liquid level conditions in the chamber whereby the floating matter may be removed from the latter throughout the range of such conditions without the discharge of an undue quantity of clear liquid.

While not necessarily limited thereto, for purposes of disclosure the invention has been illustrated in the accompanying drawings forming a part of this specification as applied to an oscillatory scum removing apparatus of the type disclosed in prior U. S. Patent No. 2,337,859, granted December 28, 1943, on an application filed by Frank G. Stuller.

Briefly, such apparatus comprises a horizontal scum receiving pipe or conduit mounted transversely of a sedimentation or similar chamber, and partially submerged in the liquid within the chamber. The upper or exposed portion of the pipe is provided with one or more openings or ports extending longitudinally thereof and with at least one of their side edges disposed at approximately the level of the liquid in the chamber, whereby scum or other matter floating on the surface of the liquid may pass into the pipe and be conveyed away through a port in a side wall of the chamber for suitable disposal. Since variations in the flow through the chamber may cause the liquid level therein to rise and fall, manually operable means are provided for oscillating the scum pipe about its axis whereby to arcuately move its ports and adjust their intake edges to any existing liquid level.

More specifically, the present invention provides means for automatically accomplishing adjustment of the scum conduit in response to rising or falling of the liquid level, whereby to obviate the necessity for a more or less constant observation of the liquid level by an attendant and manual adjustment of the conduit in accordance with observed changes in the level.

Another feature of the invention resides in controlling the adjustments of the conduit in response to the true liquid level in the chamber, uninfluenced by the presence of any scum or other floating matter on the surface of the liquid.

In the drawings referred to above:

Figure 1:
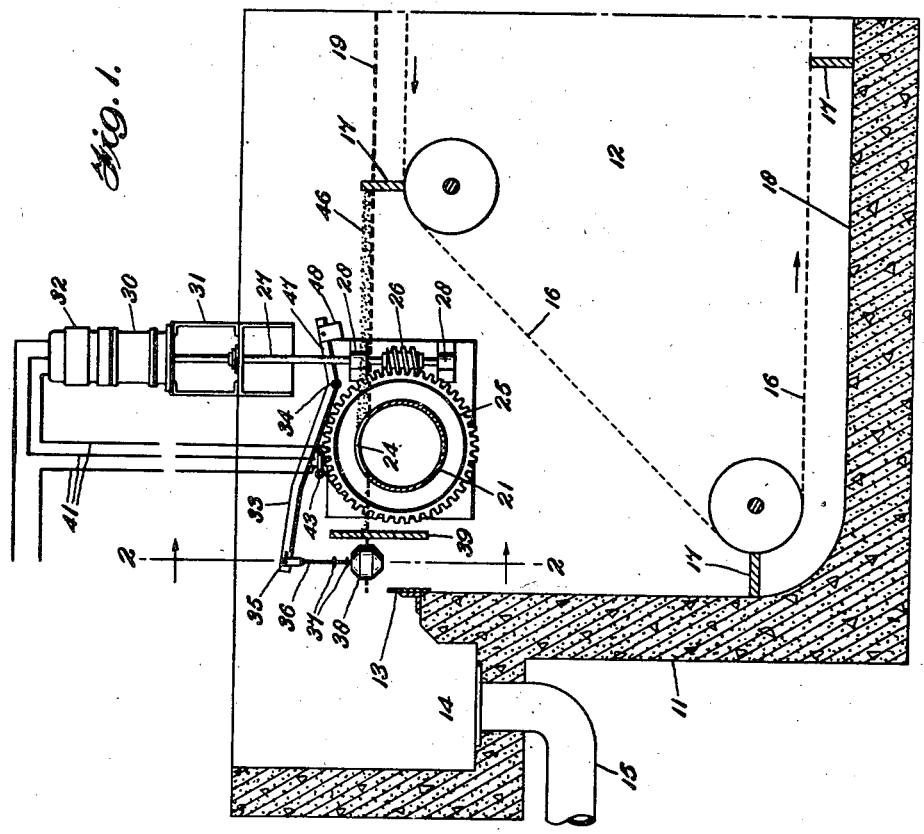
Figure 1 is a longitudinal vertical sectional view of the effluent portion of a typical rectangular sedimentation chamber equipped with scum removing apparatus of the type described above and provided with one form of mechanism constructed and arranged in accordance with the invention for automatically controlling said apparatus.
Figure 2:
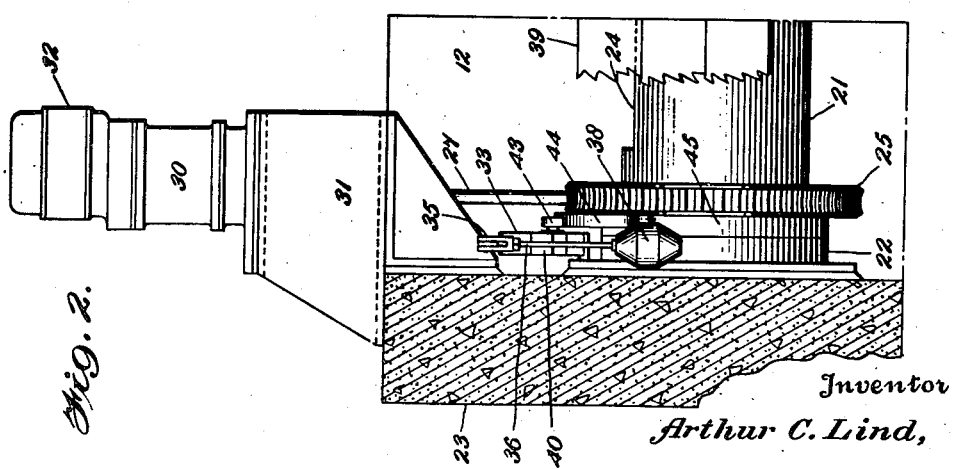
Fig. 2 is an enlarged fragmentary transverse sectional view, partly in elevation, on approximately the plane indicated by the line 2—2 of Fig. 1, looking in the direction of the arrows.

Referring first to Figs. 1-5, an end wall 11 of the sedimentation chamber 12 is provided with a vertically adjustable weir 13 over which clarified liquid in the said chamber may flow to an effluent channel 14 and discharge conduit 15. The chamber is also equipped with sludge removing mechanism of the endless conveyer type, diagrammatically indicated at 16 and having flights or scrapers 17 which traverse the bottom 18 of the chamber to transfer solids settling thereon to a sump (not shown) at the influent end of the chamber. The return run of this conveyer mechanism is disposed adjacent the liquid level 19 so that in the course of their return to the effluent end of the chamber the flights 17 break the surface of the liquid and push any scum or other matter floating on such surface to the effluent end of the chamber.

A scum pipe 21, extending transversely of the chamber, is mounted adjacent the end wall 11, being journalled for oscillatory movements in appropriate bearings 22 carried by the side walls 23 of the chamber. At one of its ends this pipe communicates with a port or opening (not shown) in one of the walls 23, through which the scum or other matter is discharged from the pipe for suitable disposal. The scum pipe is so disposed relative to the liquid level 19 that, as above indicated, it is partially submerged in the liquid, and its exposed portion is provided with one or more ports 24, preferably extending substantially throughout the length of the pipe, through which the scum may enter the latter. Adjacent one of the bearings 22 the pipe carries a worm wheel 25 which is engaged by a worm 26 carried by a vertical shaft 27 journalled in appropriate bearings 28.

The construction thus far described is or may be substantially the same as that disclosed in the above mentioned Patent No. 2,337,859. However, instead of the manually operable means set forth therein for actuating the worm gearing to oscillate the scum pipe in accordance with changes in the height of the liquid level 19, the present invention provides automatic mechanism therefor, which will now be described.

The worm shaft 27 is connected to the output shaft of a reducing gear mechanism 30, which is mounted on a bracket 31 carried by a side wall 23 of the chamber, and is driven by a reversible electric motor 32. A lever 33 is pivotally mounted at 34 on the wall flange of the pipe bearing 22, and extends forwardly over the said bearing. Its forward end has attached to it, by a pin and slot connection 35, the upper end of a rod or stem 36, which stem passes downwardly through suitable guides 37 and is provided at its lower end with a float 38. A transverse baffle 39 is disposed across the chamber 12 intermediate the float and the scum pipe 21, the said baffle extending above and below any normal variations of the liquid level 19, as will be clear from Figs. 1 and 3.

The lever 33 carries an electric switch 40 of a conventional construction appropriate to control the circuits 41 of the motor 32 whereby the latter may be started, stopped and caused to run in either direction. If the motor be of the direct current type, the switch 40 may be an ordinary reversing switch which controls the motor directly, whereas if the motor be of the alternating current type, the switch may be of a form to control it indirectly through control of the circuits of the magnetic starting, stopping and reversing mechanism commonly employed with this type of motor. Whatever its form may be, the switch 40 is provided with an operating arm 42 preferably having a roller 43 at its free end, the said arm being suitably biased to maintain the roller in engagement with a cam 44 of appropriate design, carried by the hub 45 of the worm wheel 25. The arm 42 normally occupies an intermediate position in which all contacts of the switch 40 are open, whereby the motor 32 is stopped. From this position however, the arm is movable in one direction or the other, as will appear more fully below, to close appropriate contacts in the switch to secure rotation of the motor in one direction or the other.

Figure 3:
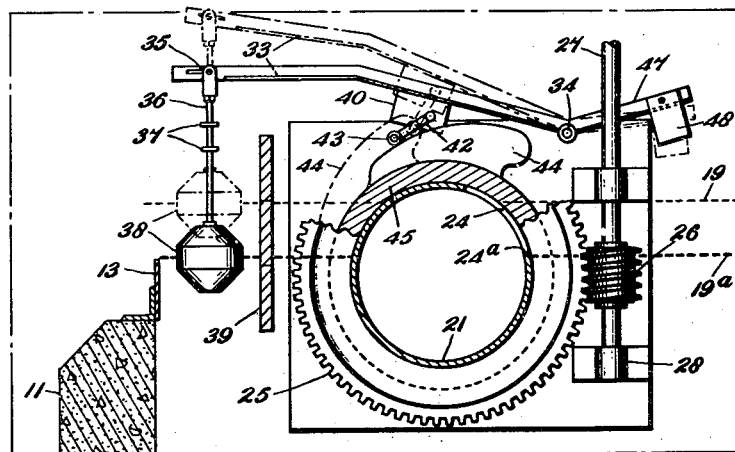
Figs. 3, 4 and 5 are enlarged fragmentary sectional-elevational views, looking in the same direction as Fig. 1, and illustrating different positions assumed by the parts in the course of an automatic adjustment in the position of the scum conduit in response to a rise in the liquid level.

In Fig. 1 the parts are illustrated in the positions they occupy when the liquid level 19 is at its maximum height, while in Fig. 3 they are shown in full lines in the positions assumed at the minimum liquid level 19ª, with the maximum level positions indicated in broken lines.

Figure 4:
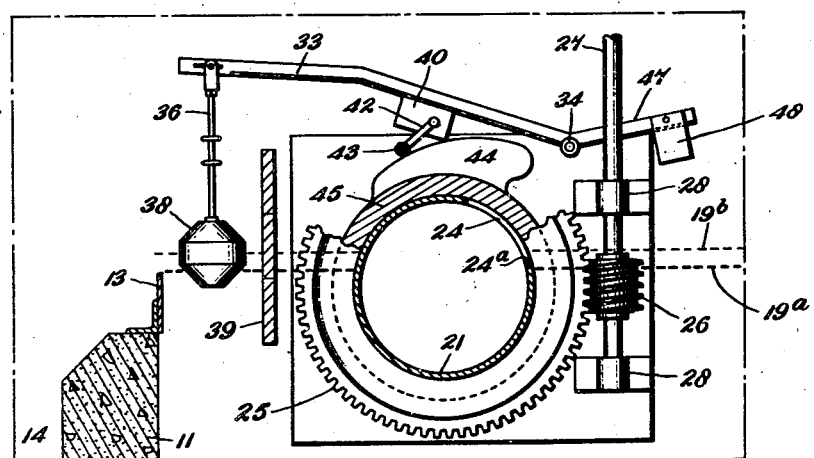
Figure 5:
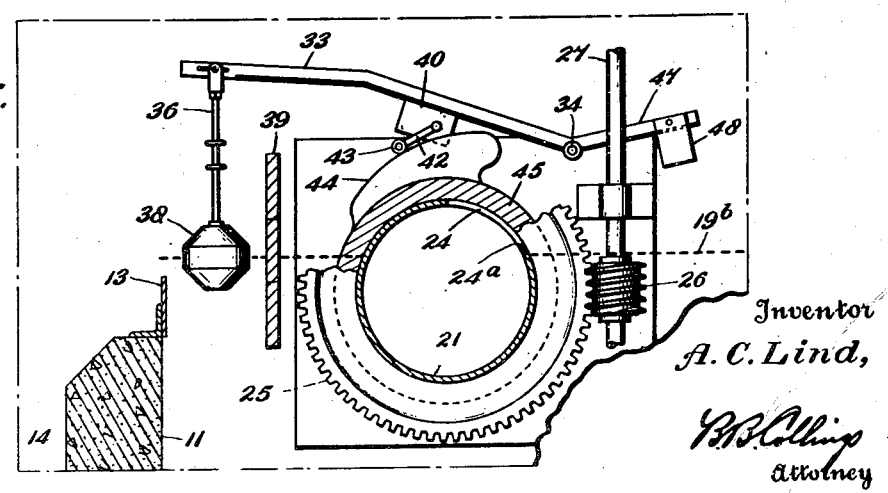

The operation of the apparatus will be best understood from a consideration of Figs. 3, 4 and 5. Assuming the parts to be in the full line positions of Fig. 3, i. e., the minimum level positions, it will be noted that the ports 24 of the scum pipe are positioned with their intake lips 24ª at approximately the liquid level 19ª so that scum 46 advanced to the scum pipe 21 by the flights 17 may pass into the pipe through such ports and thence outwardly through a chamber side wall 23 for disposal. However, if for any reason the liquid level should rise to say the plane indicated by the dotted line 19ᵇ of Fig. 4, the float 38 and lever 33 will likewise rise, moving the switch 40 upwardly relative to the cam 44 and permitting the biased arm 42 to fall and close the necessary contacts within the switch to secure rotation of the motor 32 in such direction as to cause the worm gearing 26, 25 to arcuately move the scum pipe 21 in a counterclockwise direction to the positions shown in Fig. 5, thus raising the receiving edges 24ª of the ports 24 to the new liquid level. The movement of the worm wheel 25 of course carries the cam 44 counterclockwise also, to the Fig. 5 position, and the conformation of the cam is such that this movement will return the biased switch arm 42 to its neutral position, causing the switch 40 to break the circuit and the motor 32 to stop.

Should there be a further rise in the liquid level the above operation will be automatically repeated in response thereto, up to the maximum level positions indicated in Figs. 1 and 3. On the other hand, should the liquid level fall, from any point above the minimum level 19ª, the float 38 and arm 33 will drop correspondingly, thus lowering the switch 40 relative to the cam 44 and causing its arm 42 to be moved upwardly from its neutral position. This will close another set of contacts in the switch, whereby the motor 32 will be operated in a reverse direction to impart clockwise movement to the pipe 21 and lower the intake lips 24ª of its ports 24 to the new liquid level. The cam 44 of course will also be moved in a clockwise direction, permitting the biased switch arm 42 to reassume its neutral position and stop the motor at the proper time.

It will be noted that the float 38 is positioned beyond the scum pipe 21 whereby it functions in an area free from scum and may thus be responsive to the true liquid level in the chamber. The baffle 39 is provided to retain any scum which for any reason may escape past the scum pipe, and thus further protects the float against scum influence.

The lever 33 may be provided with an extension 47 carrying an adjustable weight 48, for counterbalancing the weight of the lever and its associated parts, and thus render the mechanism more sensitive.

Figure 6:
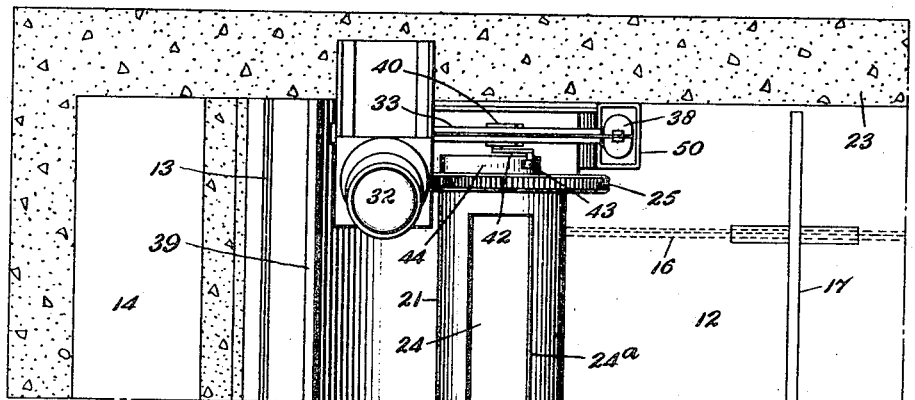
Fig. 6 is a plan view of a portion of a sedimentation chamber and scum removing apparatus, equipped with a slightly modified form of the invention.
Figure 7:
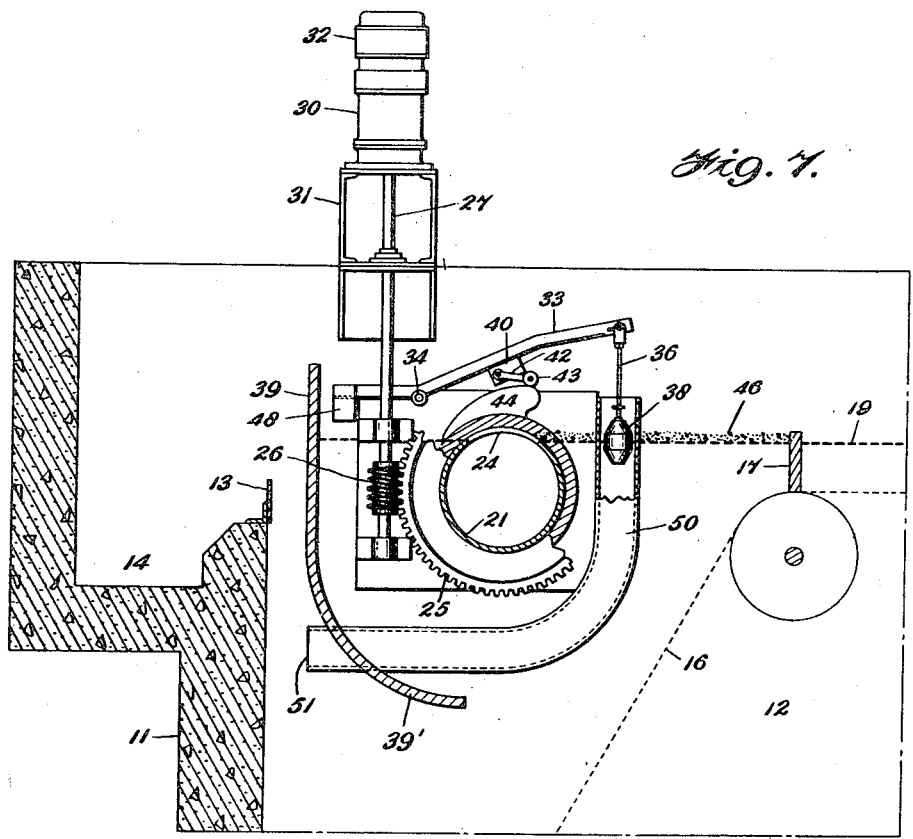
Fig. 7 is a longitudinal sectional-elevational view of the parts shown in Fig. 6.

The apparatus shown in Figs. 6 and 7 is essentially similar to that described above, the principal difference being that here the float 38 is disposed in advance of the scum pipe 21, and in order to keep it from being influenced by the scum which is being advanced to the pipe by the flights 17, the float operates in a tube or pipe 50 which extends downwardly in the liquid from above the maximum level thereof. As shown in Fig. 7, the lower portion of this tube preferably curves forwardly beneath the scum pipe and extends through a lower rearwardly curved portion 39' of the baffle 39 so that the intake end 51 of the tube is located in the scumless area beyond the baffle. In other respects the construction and operation of this form of the invention is substantially the same as that described above in connection with Figs. 1–5.

What is claimed is:

1. In apparatus for removing scum from the surface of a body of liquid in a chamber, the depth of which liquid may fluctuate with resultant variations of the surface level thereof: the combination of a scum receiver having an admission port; means for mounting said receiver in the chamber for movements whereby to vary the position of said port relative to the normal surface level of the liquid; and mechanism for automatically maintaining a substantially constant relationship between said admission port and the surface level of the body of liquid throughout all normal variations of said level, said mechanism comprising power driven means connected to the receiver for moving the same in opposite directions at will; a control device for said power driven means, adapted to start, stop and reverse the same; and members for actuating said control device whereby to initiate and stop movements of the receiver, one of said members being responsive to said depth fluctuations of the liquid, and another to said receiver movement.

2. In apparatus for removing scum from the surface of a body of liquid in a chamber, the depth of which liquid may fluctuate with resultant variations of the surface level thereof: the combination of a scum receiver having an admission port; means for mounting said receiver in the chamber for movements whereby to vary the position of said port relative to the normal surface level of the liquid; and mechanism for maintaining a substantially constant relationship between said admission port and the surface level of the body of liquid throughout all normal variations of said level, said mechanism comprising a reversible motor connected to the receiver for moving the same; a starting, stopping and reversing device controlling said motor; means comprising a float adapted to respond to said depth fluctuations of the liquid, for actuating said motor control device whereby to initiate movements of the motor and receiver; and a member operable with the receiver for actuating said motor control device to stop the motor and receiver movement.

3. In apparatus for removing scum from the surface of a body of liquid in a chamber, the depth of which liquid may fluctuate with resultant variations of the surface level thereof: the combination of a scum receiver having an admission port; means for mounting said receiver in the chamber for oscillatory movements whereby the position of said port relative to the normal surface level of the liquid may be varied; and mechanism for automatically maintaining a substantially constant relationship between said admission port and the surface level of the body of liquid throughout all normal variations of said level, said mechanism comprising a reversible motor connected to the receiver for moving the same; a starting, stopping and reversing device controlling said motor; means for actuating said motor control device whereby to initiate movements of the motor and receiver, comprising a float disposable in the liquid for response to said depth variations thereof; and a cam member carried by the receiver for actuating the motor control device to stop the motor and receiver movement.

4. In liquid clarification apparatus, the combination with means providing a chamber for containing a body of liquid the depth of which may fluctuate with resultant variations of the surface level thereof, of a scum receiver mounted in the chamber for movement in opposite directions and having an admission port disposed at substantially the normal level of the liquid surface; power driven means connected to the receiver for moving the same in either direction, whereby to vary the position of said port; a control device governing the starting, stopping and direction of motion of said power driven means; and mechanism actuating said control device concurrently with changes in the surface level of the body of liquid whereby said power driven means will maintain a substantially constant relationship between said admission port and surface level, said actuating mechanism comprising an element responsive to said depth fluctuations, disposed in a portion of the chamber wherein the surface of the liquid is free from scum.

5. In liquid clarification apparatus, the combination with means providing a chamber for containing a body of liquid the depth of which may fluctuate with resultant variations of the surface level thereof, of a scum receiver mounted in the chamber for movement in opposite directions and having an admission port disposed at substantially the normal level of the liquid surface; driving means comprising a reversible motor connected to the receiver for moving the same in either direction, whereby to vary the position of said admission port; a control device for starting, stopping and reversing said motor; an actuating element for said control device disposed in a portion of the chamber wherein the surface of the liquid will be free from scum, and responsive to depth fluctuations of liquid in such chamber portion whereby to cause the control device to start the motor and move the receiver and its port in accordance with changes in said surface level; and a member movable with the receiver to actuate the control device whereby to stop the motor.

6. In liquid clarification apparatus, the combination with means providing a chamber for containing a body of liquid the depth of which may fluctuate with resultant variations of the surface level thereof, of a scum receiver mounted in the chamber for movement in opposite directions and having an admission port disposed at substantially the normal level of the liquid surface; driving means comprising a reversible motor connected to the receiver for moving the same in either direction, whereby to vary the position of said admission port; a control device for starting, stopping and reversing said motor; a float element disposed in a portion of the chamber wherein the surface of the liquid is scum-free; connections between said float element and control device whereby the former may actuate the latter upon changes in the liquid surface level and thereby start the motor in the proper direction to shift the receiver for maintenance of a substantially constant relationship between the receiver admission port and said surface level; and a member carried by the receiver for actuating the control device to stop the motor.

7. In liquid clarification apparatus, the combination with means providing a chamber for containing a body of liquid the depth of which may fluctuate with resultant variations of the surface level thereof, of a scum receiver mounted in the chamber for movement in opposite directions and having an admission port disposed at substantially the normal level of the liquid surface; driving means comprising a reversible motor connected to the receiver for moving the same in either direction, whereby to vary the position of said admission part; a control device for starting, stopping and reversing said motor; an element responsive to said depth fluctuations of the liquid, for actuating said control device upon changes in the liquid surface level whereby to start the motor in the proper direction to shift the receiver for the maintenance of a substantially constant relationship between the receiver admission port and said surface level, said element being disposed in a portion of the chamber beyond the scum receiver where the liquid will be substantially free from scum; and a member movable with the receiver for actuating the control device whereby to stop the motor.

8. In liquid clarification apparatus, the combination with means providing a chamber for containing a body of liquid the depth of which may fluctuate with resultant variations of the surface level thereof, of a scum receiver mounted in the chamber for movement in opposite directions and having an admission port disposed at substantially the normal level of the liquid surface; driving means connected to the receiver for moving the same in either direction whereby to vary the position of said port; a control device for starting, stopping and reversing said driving means; a float for actuating said control device upon changes in the liquid surface level whereby to start the driving means in the proper direction to shift the receiver for the maintenance of a substantially constant relationship between the receiver admission port and said surface level, said float being disposed in a portion of the chamber ahead of the scum receiver; means for excluding scum from the area in which the float operates; and a member movable with the receiver for actuating the control device when the receiver has moved a determined distance whereby to stop the drive.

9. In liquid clarification apparatus, the combination with means providing a chamber for containing a body of liquid the depth of which may fluctuate with resultant variations of the surface level thereof, of a scum receiver mounted in the chamber for oscillatory movements and having an admission port disposed at substantially the normal level of the liquid surface; driving means comprising a reversible motor connected to the receiver for moving the same in either direction whereby to vary the position of said admission port; a control device for starting, stopping and reversing said motor; a float for actuating said control device upon changes in the liquid surface level whereby to start the motor in the proper direction to shift the receiver for maintenance of a substantially constant relationship between the receiver admission port and said surface level, said float being disposed in a portion of the chamber ahead of the scum receiver; a tube surrounding said float for excluding scum from the area in which the float operates; and a cam carried by the receiver for actuating the control device when the receiver has moved a determined distance whereby to stop the motor.

ARTHUR C. LIND.

REFERENCES CITED

The following references are of record in the file of this patent:

UNITED STATES PATENTS

| Number | Name | Date |
| --- | --- | --- |
| 1,709,783 | Etheredge | Apr. 16, 1929 |
| 1,981,310 | Currie | Nov. 20, 1934 |
| 2,155,960 | Thomas | Apr. 25, 1939 |
| 2,337,859 | Stuller | Dec. 28, 1943 |